US009597840B2

United States Patent
Bradway et al.

(10) Patent No.: US 9,597,840 B2
(45) Date of Patent: Mar. 21, 2017

(54) SYSTEM ARCHITECTURE FOR PRINTHEAD CLEANING USING MOBILE MAINTENANCE CARTS

(71) Applicant: Xerox Corporation, Norwalk, CT (US)

(72) Inventors: Jeffrey J. Bradway, Rochester, NY (US); Matthew D. Savoy, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 106 days.

(21) Appl. No.: 14/692,847

(22) Filed: Apr. 22, 2015

(65) Prior Publication Data

US 2016/0311171 A1 Oct. 27, 2016

(51) Int. Cl.
*B08B 3/00* (2006.01)
*B29C 67/00* (2006.01)
*B33Y 30/00* (2015.01)
*B33Y 40/00* (2015.01)
*B33Y 50/02* (2015.01)

(52) U.S. Cl.
CPC ...... *B29C 67/0096* (2013.01); *B29C 67/0055* (2013.01); *B29C 67/0088* (2013.01); *B33Y 30/00* (2014.12); *B33Y 40/00* (2014.12); *B33Y 50/02* (2014.12)

(58) Field of Classification Search
CPC ............ B29C 67/0096; B29C 67/0055; B29C 67/0088; B33Y 50/02; B33Y 30/00; B33Y 40/00
USPC .......... 134/56 R, 57 R, 58 R, 93, 6; 425/162
See application file for complete search history.

(56) References Cited

U.S. PATENT DOCUMENTS

| 2,765,547 | A | 10/1956 | Dimmel et al. |
| 2,944,275 | A | 7/1960 | Markusen |
| 5,904,100 | A | 5/1999 | Findley et al. |
| 6,191,507 | B1 | 2/2001 | Peltier et al. |
| 6,688,021 | B2 | 2/2004 | Baig et al. |
| 7,070,250 | B2 | 7/2006 | Lester et al. |
| 8,167,395 | B2 | 5/2012 | Fienup et al. |
| 8,288,004 | B2 | 10/2012 | Moorlag et al. |
| 8,692,011 | B2 | 4/2014 | Moorlag et al. |
| 8,851,664 | B2 | 10/2014 | Spence |
| 2011/0125307 | A1 | 5/2011 | Dickson et al. |
| 2012/0157277 | A1 | 6/2012 | Moorlag et al. |
| 2013/0293652 | A1 | 11/2013 | Spence et al. |
| 2013/0293653 | A1 | 11/2013 | Spence et al. |
| 2014/0125749 | A1 | 5/2014 | Spence |

FOREIGN PATENT DOCUMENTS

EP 2 474 418 B1 7/2012

*Primary Examiner* — Eric Golightly
(74) *Attorney, Agent, or Firm* — Maginot Moore & Beck LLP (57) ABSTRACT

A maintenance system for a three-dimensional printer includes a platform configured to move along a first track. An ejector head is positioned opposite a first portion of the first track. A second track is coupled to the first track at a first position prior to the ejector head, and is selectively coupled to the first track after the ejector head at a second position. A controller is configured to operate the platform to move along the second track to the first position along the first track and past the ejector head, operate the platform to perform an operation on the ejector head, and operate the platform to move along the first track to the second position to enable the platform to return to the second track.

13 Claims, 8 Drawing Sheets

SYSTEM ARCHITECTURE FOR PRINTHEAD CLEANING USING MOBILE MAINTENANCE CARTS

TECHNICAL FIELD

This disclosure relates generally to printing systems, and in particular, to maintenance devices used in three-dimensional object printing systems.

BACKGROUND

Digital three-dimensional manufacturing, also known as digital additive manufacturing, is a process of making a three-dimensional solid object of virtually any shape from a digital model. Three-dimensional printing is an additive process in which one or more printheads eject successive layers of material on a substrate in different shapes. Typically, ejector heads, which are similar to printheads in document printers, include an array of ejectors that are coupled to a supply of material. Ejectors within a single ejector head can be coupled to different sources of material or each ejector head can be coupled to different sources of material to enable all of the ejectors in an ejector head to eject drops of the same material. Materials that become part of the object being produced are called build materials, while materials that are used to provide structural support for object formation, but are later removed from the object are known as support materials. Three-dimensional printing is distinguishable from traditional object-forming techniques, which mostly rely on the removal of material from a work piece by a subtractive process, such as cutting or drilling.

Figure 8:
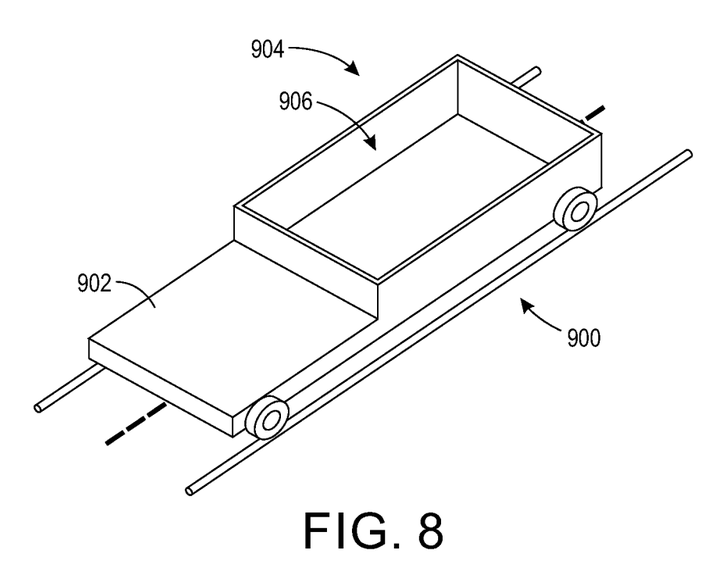
FIG. 8 is a perspective view of another exemplary embodiment of a platform usable in a three-dimensional object printing system.
Figure 10:
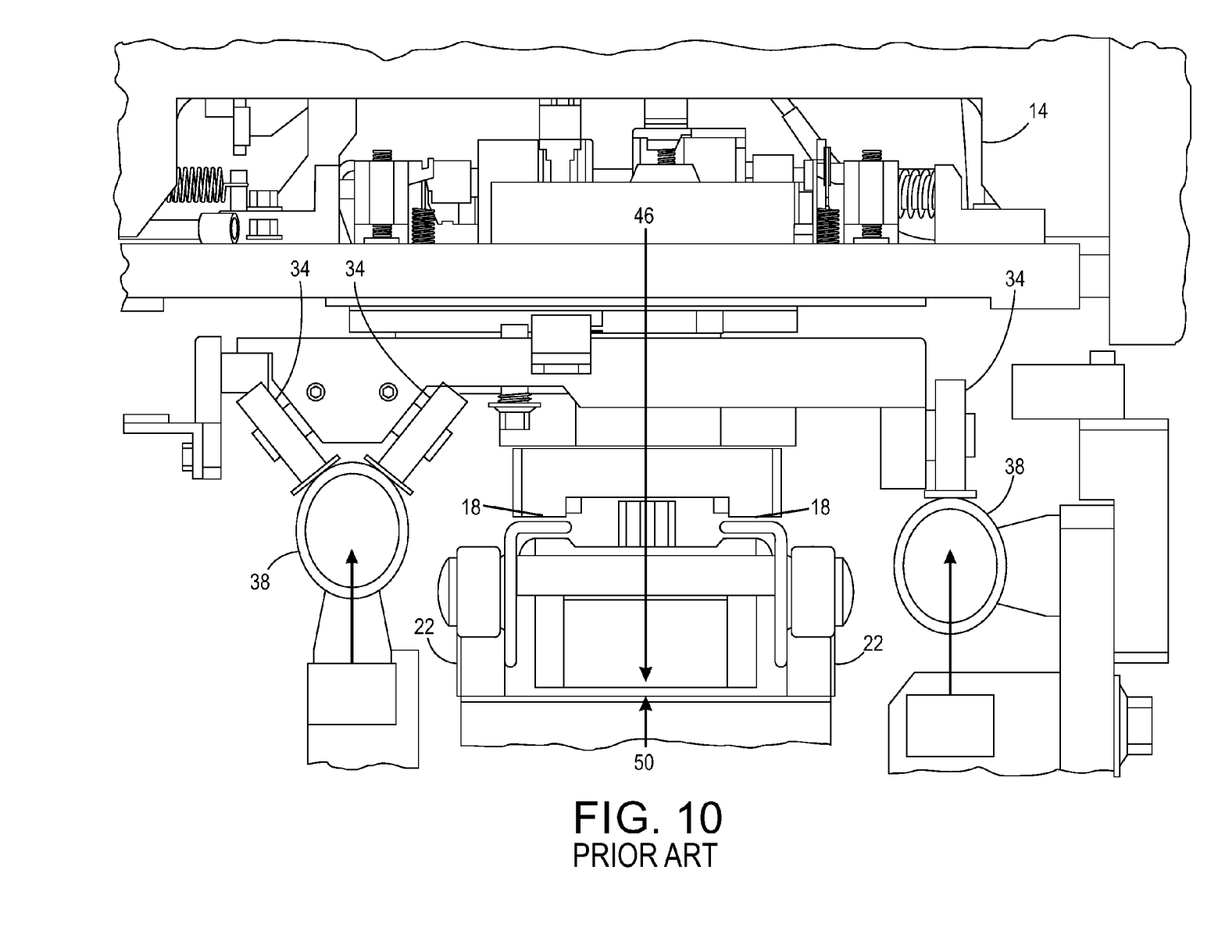
FIG. 10 is a rear view of a prior art mobile cart enabled to move along a rail track of a three-dimensional object printing system.
Figure 11:
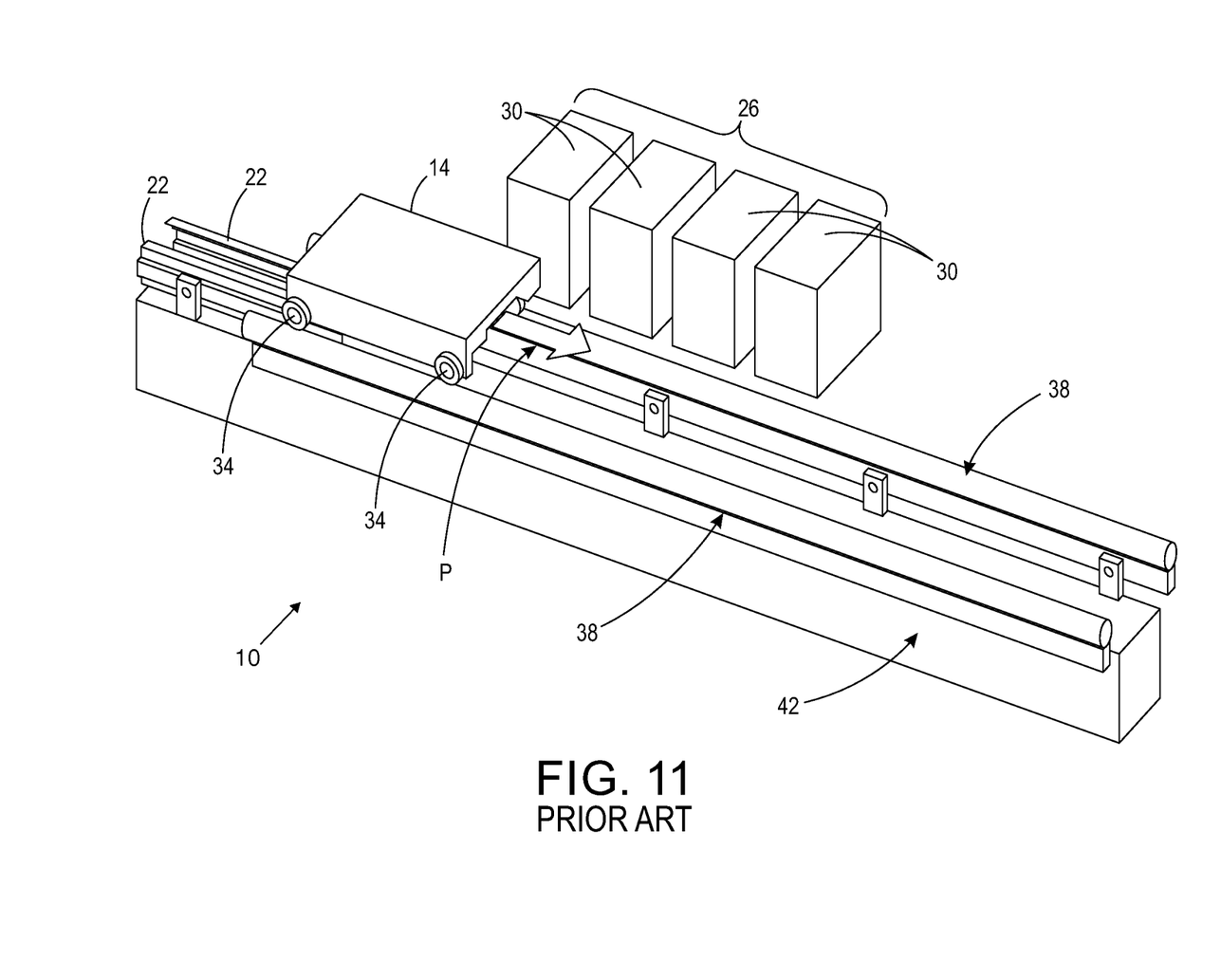
FIG. 11 is a perspective view of a prior art three-dimensional object printing system that includes a rail track and a mobile cart.

A previously known three-dimensional object printing system 10 is shown in FIG. 11. In the view depicted in that figure, a platform 14, called a cart, includes surfaces 18 (FIG. 10) that slide upon track rails 22 to enable the cart to move in a process direction P between printing stations, such as the printing station 26 shown in FIG. 11. Alternatively, carts can include wheels configured to roll along tracks, or other types of acceptable mobility mechanisms. The rails 22 terminate at a position underneath the cart 14 as shown in FIG. 11. Printing station 26 includes four ejector heads 30 as shown in the figure, although fewer or more ejector heads can be used in a printing station. Once the cart 14 reaches the printing station 26, the cart 14 transitions to precision rails 38, which begin at the termination of the rails 22, to enable bearings 34 to roll upon precision rails 38. Precision rails 38 are cylindrical rail sections that are manufactured within tight tolerances to help ensure accurate placement and maneuvering of the cart 14 beneath the ejector heads 30. The rails 38 terminate past the printing station 26, as shown in FIG. 8, where another set of rails 22 (not shown) begin and then lead to the next printing station. Linear electrical motors are provided within housing 42 to interact with a magnet positioned with housing 46 connected to the lower surface of the cart 14, as described below, to propel the cart as the surfaces 18 slide along the track rails 22 and then, once the bearings 34 transition to the precision rails 38, maneuver the cart 14 on the precision rails. As the cart 14 moves on the rails 38 past the printing station 26, the printheads eject material onto the upper surface of the cart in synchronization with the motion of the cart. Additional motors (not shown) move the printing station 26 vertically with respect to the cart 14 and in an X-Y plane parallel to the upper surface of the cart as layers of material accumulate to form an object. Alternatively, a mechanism can be provided to move an upper surface of the cart 14 on which the object is being formed vertically and in the X-Y plane to enable the layers to form the object. Once the printing to be performed by a printing station is finished, the cart 14 is moved to another printing station for further part formation, layer curing or other processing.

An end view of the system 10 is shown in FIG. 10. That view depicts in more detail the surfaces 18 on which the cart 14 slides the track rails 22. Bearings 34 of the cart 14 are positioned on the precision rails 38 in an arrangement that facilitates accurate positioning of the build platen on the cart 14. Specifically, bearings 34 are positioned at a right angle to one another on one of the rails 38 to remove 4 degrees of freedom of the cart 14, while the other bearing 34 rests on the other rail 38 to remove one more degree of freedom. Linear motors within the housing 42 generate electromagnetic fields that interact with the magnet in housing 46 to move the cart 14 over an upper surface 50 of the housing 42. Gravity and magnetic attraction between the linear motors and the magnet hold the bearings 34 in contact with the rails 38.

Material ejected by the ejector heads 30 as well as other contaminants can accumulate and present a risk of damaging or impacting the accuracy of the ejector heads 30. For example, material within an ejector head can solidify to form a clog or partially obstruct the ejector head. Material from other ejector heads or other particulates can contaminate the ejector head. Similar risks are also present for other printing stations in the printing system 10.

Material that has accumulated on an ejector head or other printing station, or extraneous material from an improperly maintained ejector head can present other risks. When carts are not present underneath the ejector heads 30, errant drips of materials can fall from the ejector heads and produce undesired debris and contamination on the precision rails 38 and the housing 42. Also, air-borne contaminants in the environment, such as dust or other particulate matter, can fall and collect on the rails 38 and the housing 42. When these contaminants and debris are located at any interface between the bearings 34 and the rails 38, the linear velocity of the cart is disrupted and the quality of the printed object is affected. Similarly, when these materials are within the gap between the top surface 50 of the housing 42 and the magnet 46, the magnetic attraction can be affected and enable the cart to be less constrained. Additionally, the collection of material drops on top of the housing 42 can also affect the dissipation of heat from the motor and cause motion quality disturbances, impacting the performance and reliability of the motor. In order to produce three-dimensional objects with acceptable quality, the motion of the cart 14 beneath the ejector heads 30 needs to be precise. Therefore, improvements in three-dimensional printing systems that help prevent the contamination on the precision rails and motor housing that affects the accuracy of the placement and movement of the cart would be beneficial.

Regular maintenance to the ejector heads 30 and other printing stations is beneficial for maintaining accurate and efficient operation of the printing system 10, and for preventing material and other contaminants from accumulating on the precision rails and motor housing. Conventional three-dimensional printing system maintenance devices often require lengthy interruptions of the printing process, and include complex machinery beyond the components necessary for three-dimensional printing that can increase the machine footprint of the system. One example of a conventional maintenance device includes a maintenance cabinet separate from the printing system 10 that can be positioned next to a printing station to be maintained. The cabinet contains tools usable to maintain the printing station. In another example, an ejector head is moved to engage with a maintenance station configured to maintain the ejector head. Including a maintenance architecture that does not interrupt the printing process and that does not significantly increase the footprint of the printing system would be beneficial.

SUMMARY

A maintenance system for a three-dimensional printer that incorporates mobile platforms includes a first track, and a platform that is operable to move along the first track in a process direction. An ejector head is positioned opposite a first portion of the first track. The maintenance system further includes a second track that is coupled to the first track at a position prior to the platform reaching the ejector head, and that is configured to selectively couple to the first track at a position that is after the platform passes the ejector head in the process direction. A disposal unit is positioned opposite a second portion of the second track. The maintenance system further includes a control that is configured to operate the platform to move along the second track to the position where the second track and the first track are coupled to enable the platform to move along the first track in the process direction past the ejector head, operate the platform to perform an operation on the ejector head, operate the platform to move to the position where the first track selectively couples to the second track after the platform passes the ejector head in the process direction to enable the platform to return to and move along the second track, and operate the disposal unit to remove three-dimensional print media from the platform.

A three-dimensional object printing system with an incorporated maintenance system includes a first track, and a platform that is operable to move along the first track in a process direction. An ejector head is positioned opposite a first portion of the first track. The maintenance system further includes a second track that is coupled to the first track at a position prior to the platform reaching the ejector head, and that is configured to selectively couple to the first track at a position that is after the platform passes the ejector head in the process direction. The maintenance system further includes a control that is configured to operate the platform to move along the second track to the position where the second track and the first track are coupled to enable the platform to move along the first track in the process direction past the ejector head, operate the platform to perform an operation on the ejector head, and operate the platform to move to the position where the first track selectively couples to the second track after the platform passes the ejector head in the process direction to enable the platform to return to and move along the second track.

A method for maintaining a three-dimensional object printing system includes operating a platform to move along a second track past a first position where the second track is coupled to a first track, and along the first track in a process direction, operating the platform to perform an operation on an ejector head positioned opposite the first track, operating the platform to move along the first track to a second position that is past the ejector head in the process direction, operating a switch to selectively couple the first track to the second track at the second position, and operating the platform to move past the second position to enable the platform to return to the second track.

BRIEF DESCRIPTION OF THE DRAWINGS

The foregoing aspects and other features of the present disclosure are explained in the following description, taken in connection with the accompanying drawings.

DETAILED DESCRIPTION

For a general understanding of the present embodiments, reference is made to the drawings. In the drawings, like reference numerals have been used throughout to designate like elements.

Figure 1:
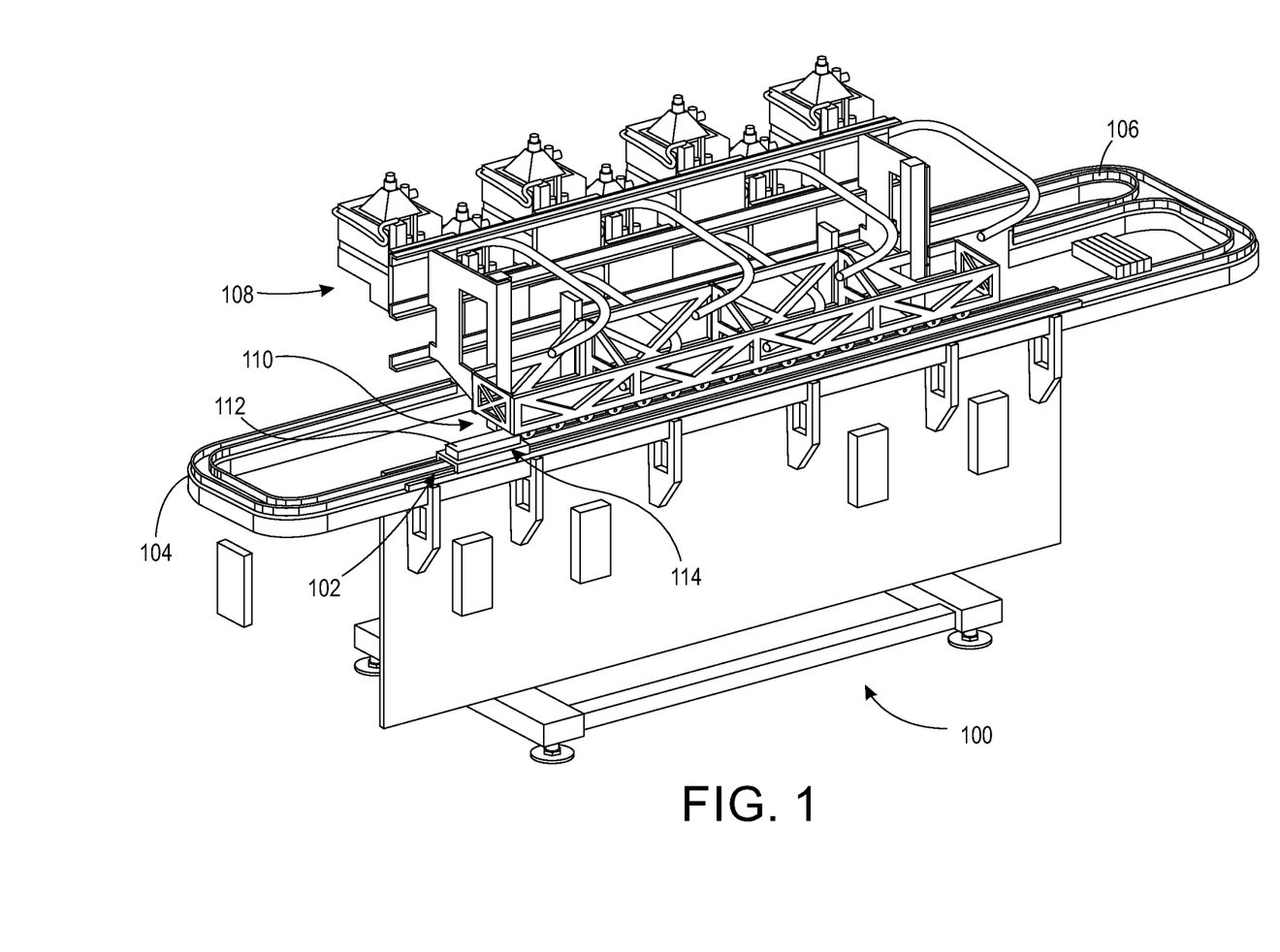
FIG. 1 is a perspective view of an exemplary three-dimensional object printing system having a maintenance system that is integrated with the printing process performed by the object printing system.

FIG. 1 illustrates an exemplary embodiment of a three-dimensional printer 100 that incorporates at least one mobile cart 102. The printer 100 includes a first track 104, a second track 106, and at least one printing station 108 positioned opposite a first portion 110 of the track 104. The mobile cart 102 includes a platform 112 that has a movement device 114, such as wheels or sliding surfaces, and is configured to move along the track 104. The platform 112 is configured to support material for forming a three-dimensional object.

In general operation, the mobile cart 102 is operated to move along the first track 104 past the printing station 108, which includes at least one ejector head configured to eject material onto the platform 112 of the mobile cart 102 to form a three-dimensional object. The second track 106 is configured to support at least one maintenance cart (not shown), described in further detail below. During a maintenance operation, maintenance carts can be operated to move from the second track 106 to the first track 104 and pass by the ejector head to perform a maintenance operation on the ejector head.

Ejector heads for three-dimensional printing systems typically require maintenance over extended use, such as at regular intervals, after a predetermined number of printing operations, or upon detection of a maintenance issue, in order to maintain accuracy, efficiency, and operability necessary for three-dimensional printing. Ejector heads can become obstructed or clogged with extraneous material, foreign materials can contaminate or damage ejector heads, and material can build up on the track 104 or other portions of the printing system 100 and interfere with the printing operation.

Figure 2:
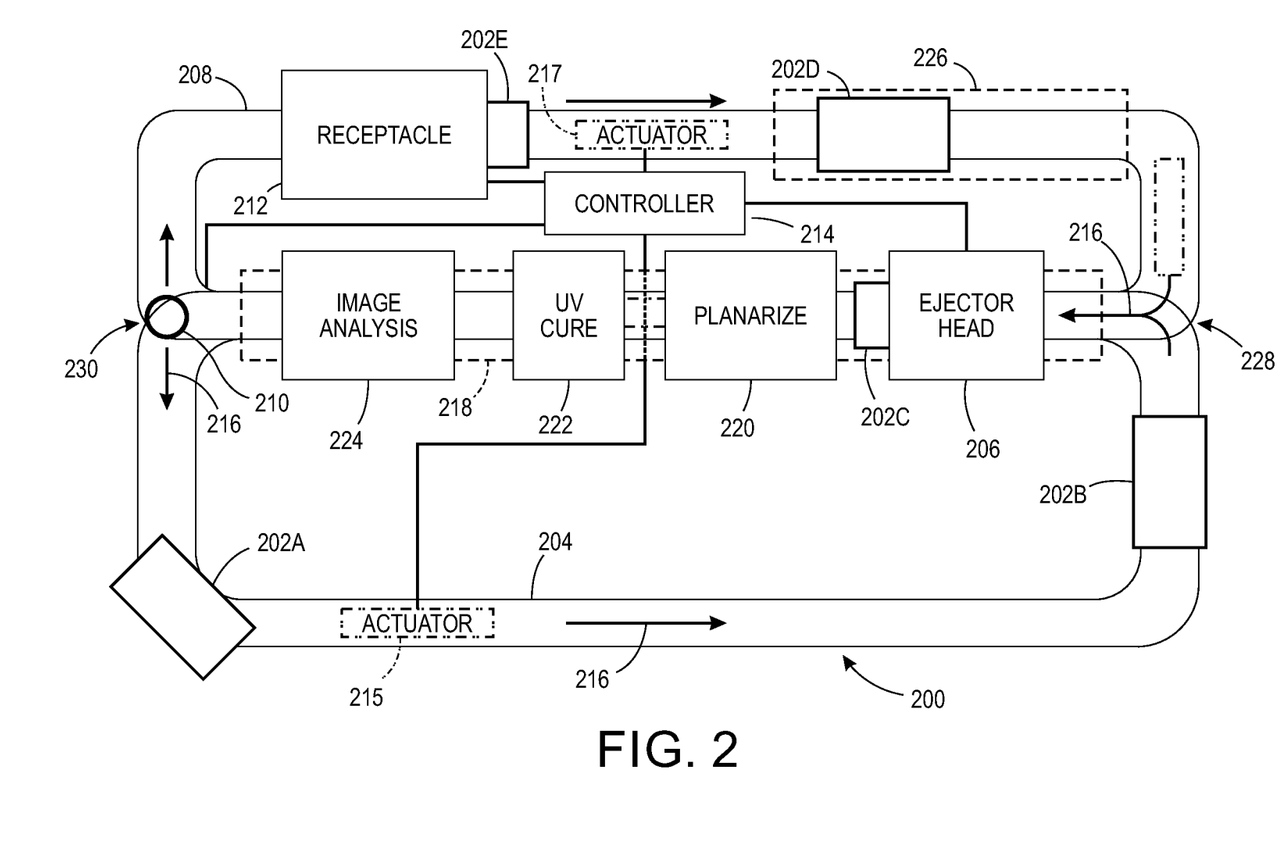
FIG. 2 is a schematic view of an exemplary embodiment of a three-dimensional object printing system having a maintenance system that is integrated with the printing process performed by the object printing system.

FIG. 2 illustrates a schematic view of a three-dimensional printing system 200 that incorporates a maintenance system that coordinates well with the printing process performed by the printing system 200. The system 200 includes at least one platform, such as the platforms 202a-e, a first track 204, an ejector head 206, a second track 208, a switch 210, a receptacle 212, and a controller 214. Pluralities of actuators 215, 217 are positioned within a housing of the first and second tracks 204, 208 respectively. Each of the platforms 202a-e includes a plurality of wheels (not shown, see, e.g., FIG. 3) or other types of acceptable movement mechanisms, such as the sliding surfaces 18 illustrated in FIG. 10, that are configured to engage with and roll along the first and second tracks 204, 208 to enable the platforms 202a-e to move through the system 200.

Actuators 215 within the first track 204 are configured to operatively engage with magnets positioned in or below the platforms to enable, for example, the media platforms 202a and 202b to move along the first track 204 in a process direction 216. While several actuators 215 are illustrated in FIG. 2, the reader should understand that actuators 215 are distributed along the first track 204 in order to engage with platforms 202a-e as they move therealong, and that only several such actuators 215 are illustrated in FIG. 2 for the purpose of clarity. Other types of actuators, such as motors powering the plurality of wheels of a platform, conveyers, or blowers are also contemplated. The reader should understand that in the present embodiment, the first track 204 is a continuous loop, and the process direction 216 refers to a direction of motion around the loop which, in FIG. 2, is counter-clockwise.

In one embodiment, the first track 204 include, in sections, cylindrical rails such as the precision rails 38 illustrated in FIG. 11, and includes, in sections, slide rails such as the track rails 22 illustrated in FIG. 11. In an embodiment, the first track 204 includes cylindrical rails in sections opposite which printing stations are positioned, and includes slide rails in sections without cylindrical rails. In one embodiment, the slide rails and cylindrical rails overlap each other in the process direction, at least in part, to enable platforms to transition therebetween.

The ejector head 206 is configured to eject material for forming a three-dimensional object, and is positioned opposite a first portion 218 of the first track 204. As illustrated in FIG. 2, the first portion 218 includes multiple printing stations in addition to the ejector head 206, such as a planarizing station 220, a UV cure station 222, and an image analysis station 224, but other configurations and numbers of printing stations are also contemplated. In one embodiment, at least one printing station is located opposite another portion of the first track 204 spaced apart from the first portion 218. Although illustrated as a single ejector head, it should be understood that the ejector head 206 can be an array of ejector heads. Moreover, the system 100 can include additional ejector heads or arrays of ejector heads positioned opposite the first track 204.

The controller 214 is operatively connected to the actuators 215 of the first track 204 and to the ejector head 206, and is configured to operate the actuators 215 to move media platforms, such as the platform 202b, along the first track 204 in the process direction 216. When a media platform is opposite the ejector head 206, the controller is further configured to operate the ejector head 206 to eject material onto the platform with reference to three-dimensional object data in order to form a three-dimensional object. In some embodiments, the controller 214 is further operatively connected to a height actuator (not shown) configured to modify a distance between the platforms 202a-e and the ejector head 206 to enable three-dimensional printing at different heights, layers, or distances. The height actuator can be included, for example, with the platforms 202a-e, with the first track 204 at a position opposite the ejector head 206, or with the ejector head 206. The controller 214 is also operatively connected to other printing stations and is configured to perform other printing operations via the other printing stations. The connections between the controller and the other printing stations 220-224 are not shown in FIG. 2 for the purpose of clarity.

The system 200 includes at least one maintenance platform, such as the platforms 202c-e. Maintenance platforms are operable to perform a maintenance operation on a printing station, such as the ejector head 206. A second portion 226 of the second track 208 is configured to support maintenance platforms to enable a maintenance platform, such as the platform 202d, to remain on the second portion 226 during a time period in which the platform 202d is unused.

The second track 208 is coupled to the first track 204 at a first position 228 to enable maintenance platforms to move from the second track 208 to the first track 204. The first position 228, on the first track 204, is before the first portion 218 in the process direction 216 such that a maintenance platform moving from the second track 208 to the first track 204 passes by the first portion 218 when continuing to move along the first track 204.

The controller 214 is further operatively connected to actuators 217 of the second track 208. While FIG. 2 illustrates several of the actuators 217, the reader should understand that additional actuators 217 can be distributed along the second track 208. The actuators 217 are configured to move maintenance platforms along the second track 208 towards the first position 228, onto the first track 204, and along the first track 204 in the process direction 216. When a maintenance platform passes by a printing station, such as the platform 202c passing by the ejector head 206, the controller 214 is further configured to operate the maintenance platform to perform an operation on the printing station, e.g., the ejector head 206. A particular platform can be operable to perform an operation on a particular printing station. In another example, a platform can be operable to perform one or more operations on one or more different printing stations. For instance, the printing system 200 can include different maintenance platforms that are each operable to perform a different maintenance operation.

The first track 204 is selectively coupled to the second track 208 at a second position 230 that is after the first portion 218 in the process direction 216. In the present embodiment, the switch 210 is operable to selectively couple the first and second tracks 204, 208 at the second position 230, but other selective coupling mechanisms are also contemplated. The controller 214 is operatively connected to the switch 210, and is further configured to operate the switch 210 to return maintenance platforms to the second track 208, and to enable media platforms to remain on the first track 204.

As illustrated in FIG. 2, when the second track 208 is coupled with the first track 204, another continuous loop is formed by the second track 208 and the first portion 218 of the first track 204. In the present embodiment, the maintenance platforms 202c-e move along the other continuous loop in a clockwise direction such that both the maintenance platforms 202c-e and the media platforms 202a and 202b move along the first portion 218 in the same direction.

The receptacle 212 is positioned opposite the second track 208 and, for example, between the second position 230 and the second track portion 226. In other embodiments, the receptacle 212 is positioned elsewhere, such as between the second portion 226 and the first position 228. After performing an operation on a printing station, a maintenance platform may include extraneous matter that is desirably removed before performing another operation. The receptacle 212 is advantageously operable to remove matter from maintenance platforms.

The controller 214 is operationally connected to the receptacle 212, and is further configured to operate the receptacle 212 to remove material from the maintenance platform 202e positioned at the receptacle 212. Examples of such removal are described in further detail below. Once material has been removed from a maintenance platform, such as the platform 202e, the controller 214 is further configured to operate the actuators of the second track 208 to return the maintenance platform to the second track portion 226.

Maintaining the printing stations while minimizing interruptions in the printing process of the system 200 can beneficially enable a steady workflow of printing operations, and a decrease in downtime for printing station upkeep. It is also desirable that maintenance platforms not collide with or impede the movement of media platforms. Advantageously, the controller 214 can be further configured to coordinate movement of maintenance platforms 202c-e with the movement of media platforms 202a and 202b by selectively operating the actuators 215, 217 of the first and second tracks 204, 208, and the switch 210. In other words, the controller 212 can be configured to schedule an operation on a printing station during a period of time when a media platform is not occupying in the printing station. For example, the controller 212 can schedule operations at predetermined intervals, after a predetermined number of printing operations, upon detection of a maintenance fault, such as a clog or contamination, or before or after a particular printing operation.

Because the second track 208 is integrated with the first track 204 such that both maintenance platforms 202c-e and media platforms 202a and 202b pass through the first portion 218, a footprint of the printing system 200 is reduced relative to systems having a maintenance station that is separate from the printing stations. Further, the integrated nature of the maintenance platforms 202c-e with the workflow of the printing process eliminates the need to connect and setup a maintenance station, such as a maintenance cabinet, that may need to be individually moved to and configured to operate with each individual printing station. The printing system 200 according to the disclosure enables performing different operations on different printing stations while eliminating the often time consuming and complicated setup procedures involved in conventional maintenance systems.

In an example of an operation on a printing station, when maintenance platform 202c is positioned opposite the ejector head 216, the controller 214 is configured to operate the ejector head 206 to eject material onto the maintenance platform 202c. Such ejection can purge extraneous material or contaminants from the ejector head 206, remove or prevent a clog, clean material from the ejector head 206, or prevent extraneous material from accumulating on, for example, the first track 204.

Figure 3:
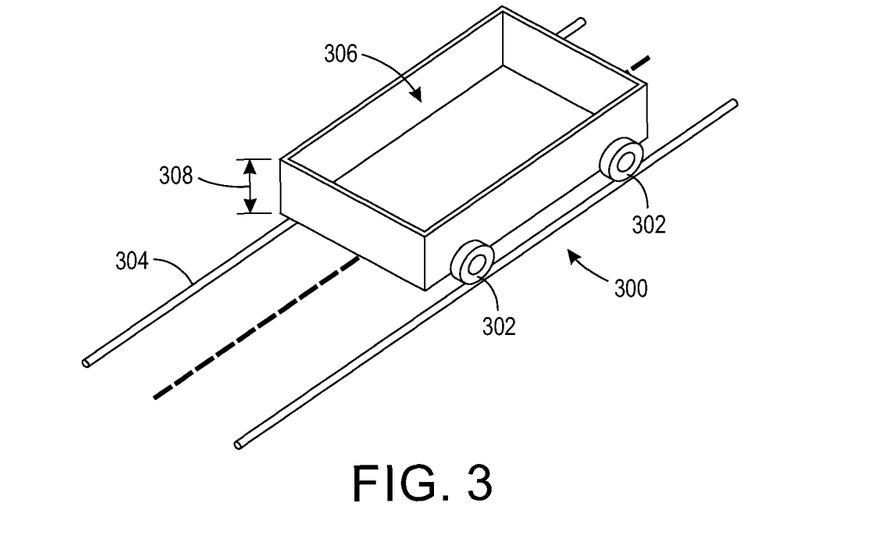
FIG. 3 is a perspective view of an exemplary embodiment of a platform usable in a three-dimensional object printing system.

FIG. 3 illustrates an exemplary embodiment of a maintenance platform 300 that includes a plurality of wheels 302 configured to engage with a track 304, such as the precision rails 38 (FIG. 11) and a tray 306 configured to receive material ejected from an ejector head. The tray 306 has a height 308 configured to retain material ejected therein. In other embodiments, the platform 300 includes other movement mechanisms, such as slide surfaces configured to engage rails like the rails 22 in FIG. 11. In one embodiment, the platform further includes a magnet configured to engage with actuators in the track 304 to enable the platform 300 to move along the track 304.

In one embodiment, the platform 300 comes to a stop beneath the ejector head to enable the ejector head to purge material into the tray 306. While integrating maintenance platforms with media platforms to perform operations as described above is beneficial to reducing delay in the printing process, purging material from an ejector head may result in a delay before the ejector head is again usable for printing onto a media platform. In another embodiment, the platform 300 remains in motion along the track 304 while the ejector head purges material into the tray 306 as the platform 300 passes by, thereby further reducing or even eliminating the delay. The platform 300 can move along the track 304 at full process speed, or at a reduced rate of speed in order to facilitate the purging of material from the ejector head.

Figure 4:
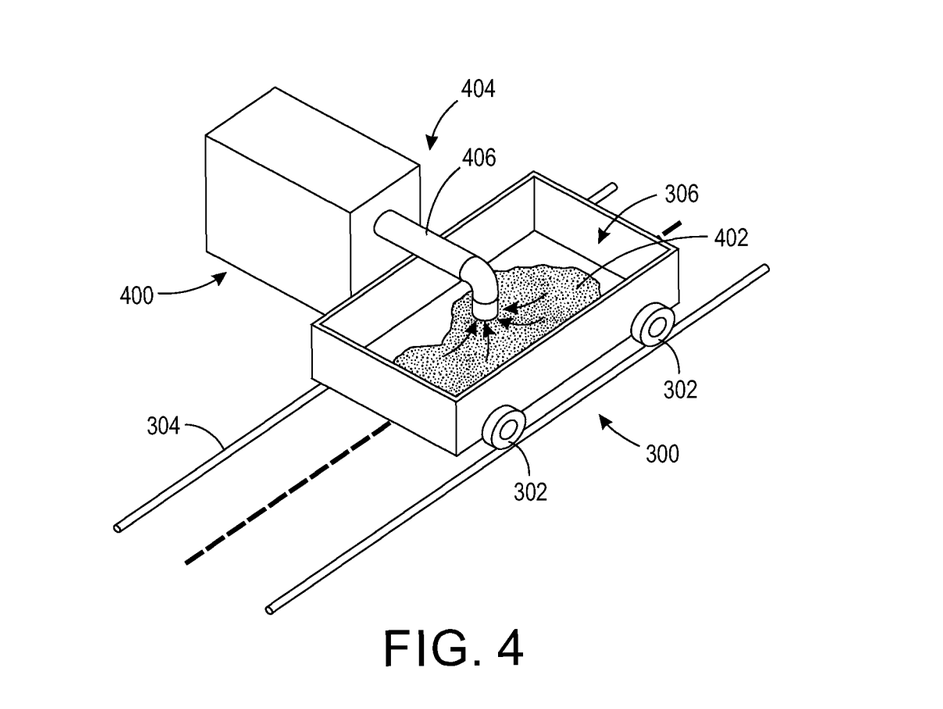
FIGS. 4 and 5 are different exemplary embodiments of receptacles for removing material from a platform of a three-dimensional object printing system.

While a single operation may not fill the tray 306, removal of material from the tray 306 can be beneficial so the platform 300 can be continuously used. Advantageously, the receptacle 212 (FIG. 2) is operable to remove material from maintenance platforms such as the platform 300. FIG. 4 illustrates an exemplary embodiment of a receptacle 400 that is operable to remove material 402 from the tray 306 of the platform 300.

The receptacle 400 includes a vacuum source 404 configured to generate a vacuum proximate to the tray 306 in order to remove material 402 from the tray 306. Advantageously, the vacuum source 404 further includes a tube 406 configured to direct the vacuum generated by the vacuum source 404. In one embodiment, the vacuum source 404 further includes an actuator (not shown) operatively connected to the tube 406 and configured to lower the tube 406 into the tray 306 for the removal of material 402 and raise the tube 406 out of the tray 306 to enable the platform 300 to depart from the receptacle 400. In another embodiment, the actuator is configured to articulate the tube 406 in order to move the vacuum source 404 within the tray 306 to remove material 402 dispersed around various portions of the tray 306. The controller 214 (FIG. 2) is operatively connected to the receptacle 400 and is configured to operate the vacuum source 404, the actuator connected to the tube 406, and the actuators of the track 304 to remove the material 402 from the tray 306 of the platform 300.

Figure 5:
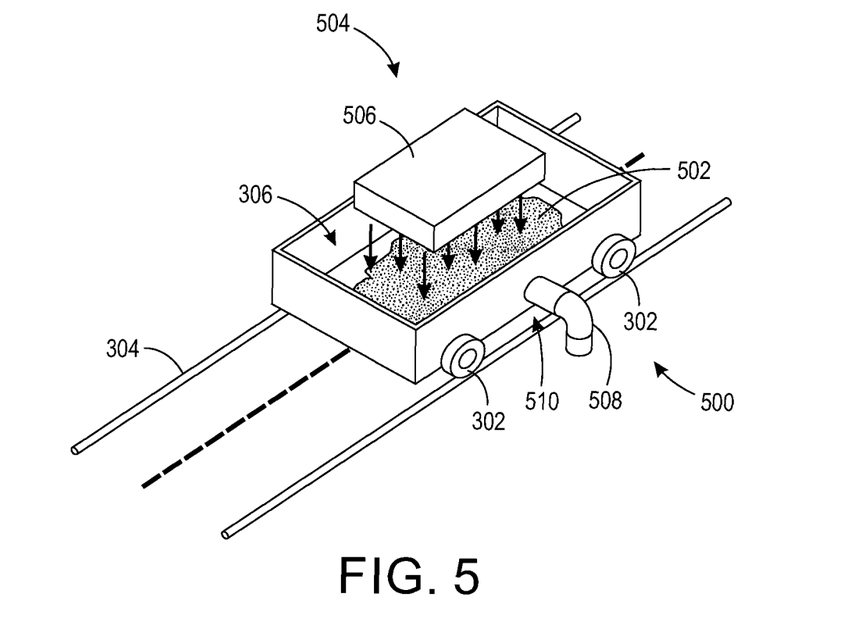

FIG. 5 illustrates another exemplary embodiment of a receptacle 500 operable to remove material 502 from a maintenance platform 504. The receptacle 500 includes a heater element 506 and a heated umbilical 508, and the platform 504 includes wheels 302 configured to engage with and roll along the track 304, a tray 306 configured to receive material 502, and a drain 510.

The heated umbilical 508 is configured to selectively couple with the drain 510. In an embodiment, the receptacle 500 includes an actuator (not shown) operably connected to the heated umbilical 508 and configured to couple the heated umbilical 508 with the drain 510 when the platform 504 is positioned opposite the receptacle 500. The heater element 506 is positioned and configured to radiate heat into the tray 306 to liquefy the material 502. The drain 510 is configured to enable liquefied material to exit from the tray 306 into the heated umbilical 508. The heated umbilical 508 is heated, such as by, for example, a heating element, to enable the liquefied material to remain in a liquefied state while passing through the umbilical, which can beneficially aid in the prevention of clogs or maintain a steady flow of material through the heated umbilical 508. In an embodiment, a further actuator is operatively connected to the heater element 506 and is configured to move the heater element towards the platform 300 to enable more efficient radiation of heat to the material 502 and way from the platform 300 to enable the platform 300 to depart from the receptacle 500.

Other types and combinations of removal mechanisms are also contemplated, including but not limited to an articulated scoop operable to scoop material from within the tray 306, and a fluid source operable to introduce a fluid into the tray 306 in order to dilute, dissolve, or otherwise react with material in the tray 306 to facilitate removal of the material. In one embodiment, the receptacle 400 is configured to house a chemical reagent, and the tube 406 is further configured to introduce the chemical reagent to material 402 in the platform 300 (FIG. 4). As used herein, "reagent" or "chemical reagent" means a substance that, when added to another substance, such as material in a tray, brings about a change in the other substance, and can include, for example, liquidizers, solidifiers, solvents, and catalysts, and may or may not be consumed when added to the other substance. Advantageously, the chemical reagent reacts with the material 402 but not the platform 300. In one example, the chemical reagent is introduced in order to transform the material 402 into a liquefied form, whereby the liquefied material and the chemical reagent exit the tray 306 via a drain similar to the drain 510 (FIG. 5). In another example, a chemical reagent, light, or heat is introduced to material 402 that is in a liquid form in order to solidify the material 402 before the material is removed from the platform 300. Some types of material ejected at a printing station can be volatile or dangerous, and it can be beneficial to cure, solidify, or otherwise modify the material before disposal. In another example, the platform itself is disposed of.

Because a single operation may not result in the tray 306 being completely filled with material, removing material from the platform 300 less than every time the platform passes by the receptacle is beneficial so the tray can remain in use. In one embodiment, the controller 212 is configured to move the platform 300 to the receptacle 212 and operate the receptacle 212 with reference to an estimated amount of material ejected into the tray during at least one operation, a predetermined number of operations, a predetermined time period or other criteria.

In one embodiment, the platform 300 further includes a sensor (not shown) configured to generate an electrical signal indicative of a fill condition of the tray 306. In an example the sensor can be a weight sensor, or an optical sensor. The controller 214 (FIG. 2) can, for example, be configured to move the platform 300 to the receptacle 212 and operate the receptacle 212 with reference to the electrical signal generated by the sensor.

Figure 6:
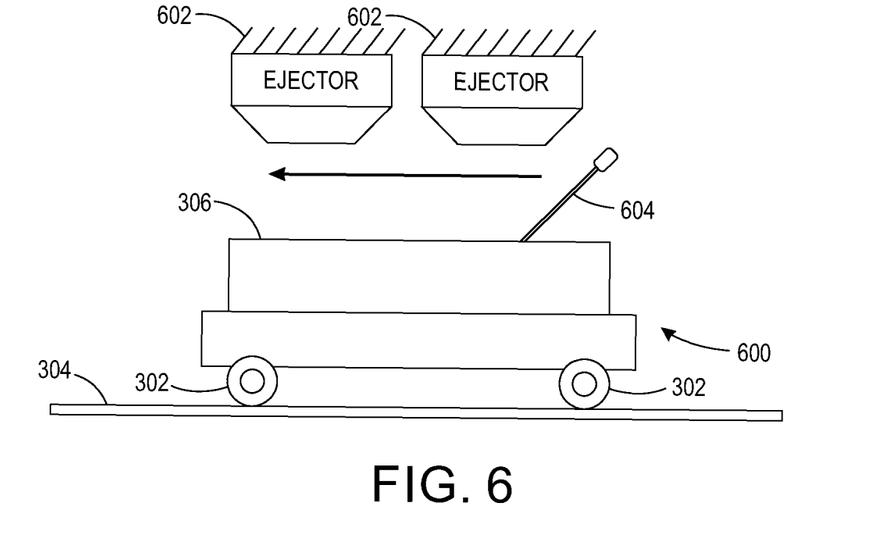
FIGS. 6 and 7 are perspective views of different exemplary embodiments of printhead maintenance devices attached to a platform usable in a three-dimensional object printing system.

In another example of an operation, wiping a face of the ejector head is beneficial to remove extraneous material or contaminants, remove or prevent clogs, and otherwise maintain the ejector head. FIG. 6 illustrates an exemplary embodiment of a maintenance platform 600 that is operable to wipe an ejector 602. The platform 600 includes wheels 302 configured to engage with a track 304, and a wiper 604 connected to the platform 600. In embodiments where the platform 600 further includes a tray 306, the wiper 604 can be connected to the tray 306. The wiper 604 is positioned and configured to wipe the ejector 602 when the platform 600 is moved along the track 304 to the ejector 602. The wiper 604 can be, for example, a rigid wiper that wipes as the platform 600 moves, a wiper connected to a passive or active actuator, or another type of wiping mechanism.

In a further example of an operation, covering an ejector head during a period of time in which the ejector head is unused can be beneficial to protect the ejector head from damage and contamination, and to inhibit material within the ejector head from solidifying and potentially forming clogs. In another example, some types of materials ejected by an ejector head, such as UV curing material, can be volatile or dangerous, and covering the ejector head during periods of nonuse to limit the exposure of such materials to the environment can be beneficial.

Figure 7:
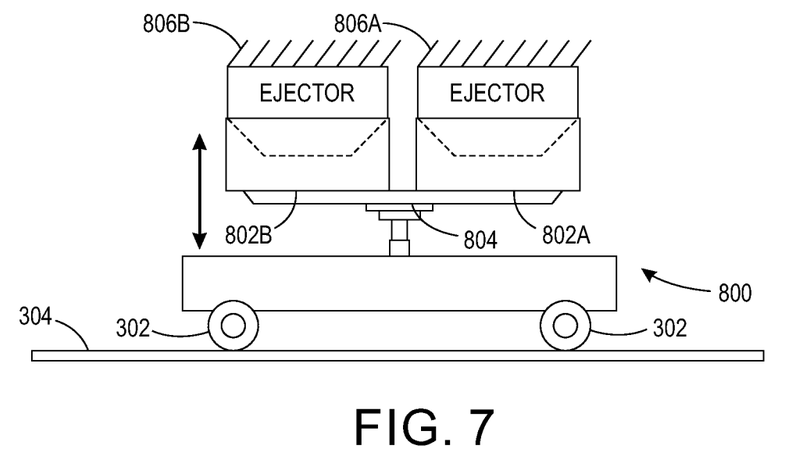

FIG. 7 illustrates an exemplary embodiment of a platform 800 that includes wheels 302 configured to engage with and roll along the track 304, covering members 802a and 802b, and an actuator 804. The covering members 802a and 802b are configured to cover ejector heads 806a and 806b. While the platform 800 is illustrated as including two covering members 802a and 802b, the reader should understand that the platform 800 can include different numbers of covering members to comport with different numbers of ejector heads in an ejector head array.

The actuator 804 is operatively connected to the covering members 802a and 802b and is configured to cover the ejector heads 806a and 806b with the covering members 802a and 802b when the platform 800 is positioned opposite the ejector heads 806a and 806b. While FIG. 8 illustrates the two covering members 802a and 802b as being operatively connected to a single actuator 804, other numbers of covering members can be connected to a single actuator. In one embodiment, each covering member is operatively connected to a respective actuator to enable separate ejector heads to be individually covered or uncovered. The actuator 804 is, for example, operatively connected to the controller 212 (FIG. 2), which can be configured to operate the actuator 804 to cover the ejector heads 806a and 806b during a period of time in which the ejector heads 806a and 806b are unused, and can further be configured to uncover the ejector heads 806a and 806b to enable the platform 800 to depart from the ejector heads 806a and 806b.

Other types of covering mechanisms are also contemplated such as, for example, a covering mechanism configured to respond to a passive actuator, a covering mechanism configured to selectively cover a particular ejector head, and other types of covering mechanisms.

Figure 9:
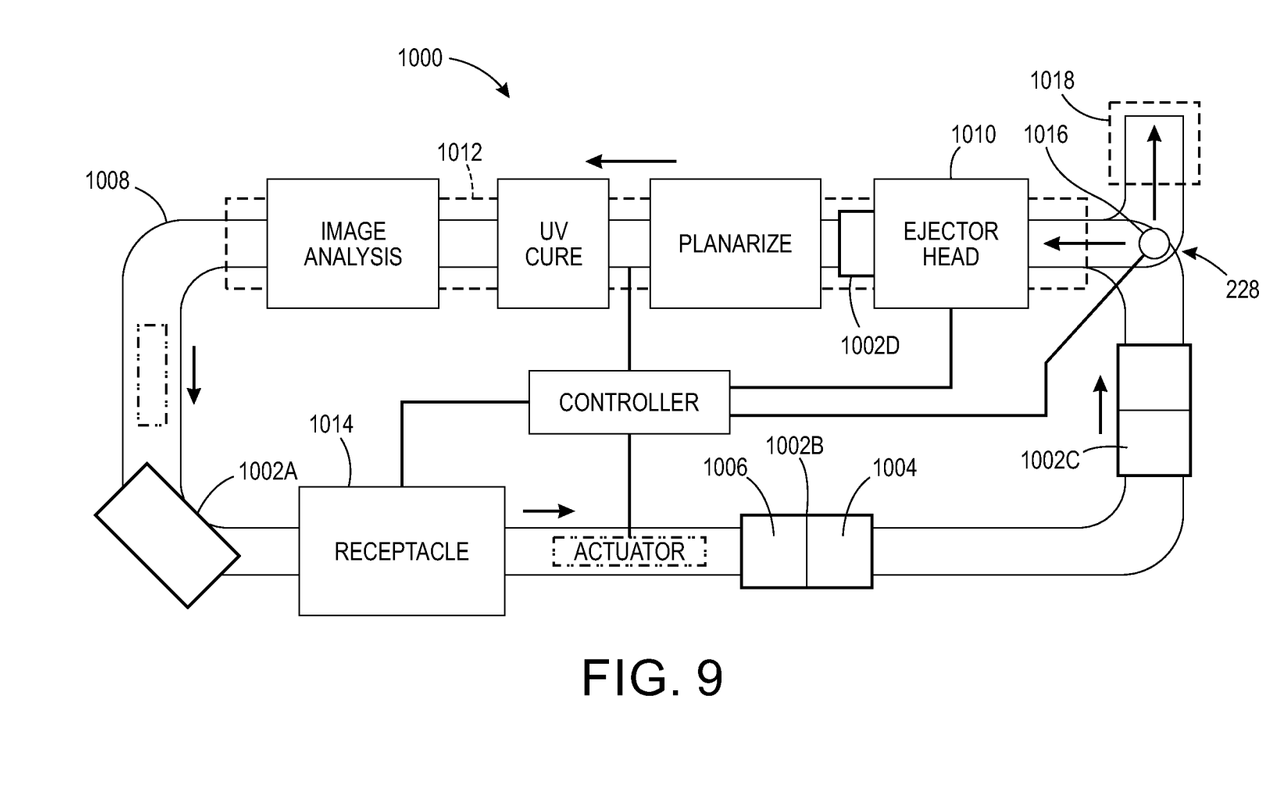
FIG. 9 is a schematic view of another exemplary embodiment of a three-dimensional object printing system that incorporates hybrid media-maintenance platforms.

FIG. 8 illustrates another exemplary embodiment of a platform 900 usable in a three-dimensional object printing system. The platform 900 includes a surface 902 configured to receive material to form a three-dimensional object, and also includes a maintenance portion 904. As shown in FIG. 9, the maintenance portion 904 includes a tray 906 configured to receive material purged from an ejector head as described above in order to perform a maintenance operation, but the maintenance portion 904 can also include other mechanisms in other embodiments, such as a wiper, covering member, and the like. The platform 900 is thus a hybrid platform that is both a media platform and a maintenance platform. In an embodiment, a printing system has one or more hybrid platforms in addition to or instead of media platforms and maintenance platforms such as the platforms 202a-e in FIG. 2.

FIG. 9 illustrates an exemplary embodiment of a three-dimensional object printing system 1000 that does not include a second track 208 as described above in FIG. 2 for the system 200. The system 1000 includes hybrid platforms 1002a-d. Because each hybrid platform 1002a-d includes a contiguous area 1004 for object formation and a contiguous area 1006 used for maintenance operations, the platforms 1002a-d can remain on a unitary track 1008. Printing stations that include an ejector head 1010 are positioned opposite a first portion 1012 of the track 1008, and a receptacle 1014 is positioned opposite the track 1008 at a location spaced apart from the first portion 1012. In some embodiments, a switch 1016 is operable to selectively couple a holding track 1018 to the track 1008 to enable at least one of the platforms 1002a-d to remain on the holding track 1018 during a period in which the one of the platforms 1002a-d is unused.

Platforms used in the disclosed systems can include other maintenance mechanisms in addition to or instead of the tray, wiper, and covering members described above. For example, a platform can include a maintenance mechanism, such as but not limited to, a blower operable to blow air over an ejector to remove contaminants, a vacuum source operable to produce a vacuum proximate to an ejector head, or an emitter configured to emit a cleaning fluid onto an ejector head.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A three-dimensional object printing system comprising:
a first track;
a platform that is operable to move along the first track in a process direction;
an ejector head positioned opposite a first portion of the first track;
a second track that is coupled to the first track at a position prior to the platform reaching the ejector head and that is configured to selectively couple to the first track at a position that is in the process direction after the platform passes the ejector head; and
a controller configured to:
operate the platform to move along the second track to the position where the second track and the first track are coupled to enable the platform to move along the first track in the process direction past the ejector head;
operate the platform to perform an operation on the ejector head; and
operate the platform to move to the position where the first track selectively couples to the second track after the platform passes the ejector head in the process direction to enable the platform to return to the second track.

2. The printing system of claim 1, the platform further comprising:
a tray configured to receive material ejected by the ejector head.

3. The printing system of claim 2 further comprising:
a receptacle positioned opposite a second portion of the second track, the receptacle being configured to remove material from the tray of the platform.

4. The printing system of claim 3, the receptacle further comprising:
a vacuum source configured to produce a vacuum proximate to the tray of the platform to remove material from the tray when the platform is positioned on the second portion of the second track opposite the receptacle.

5. The printing system of claim 3, the tray further comprising:
a drain that enables liquefied material to exit the tray; and
the receptacle includes a heater element configured to liquefy material within the tray when the platform is positioned on the second portion of the second track opposite the receptacle to enable liquefied material to exit the tray via the drain into the receptacle.

6. The printing system of claim 3, the receptacle being further configured to house a reagent that is configured to (i) liquefy material in the tray, or (ii) solidify material in the tray; and
the controller being further configured to dispense the reagent into the tray to enable removal of liquefied or solidified material from the tray.

7. The printing system of claim 1, the second track further comprising:
a portion configured to support a plurality of wheels and the platform during a time period in which the platform is unused.

8. The printing system of claim 1 further comprising:
another platform that includes a surface configured to receive material to form a three-dimensional object, and that is operable to move along the first track;
wherein the controller is further configured to:
operate the other platform to move along the first track in the process direction past the ejector head; and
operate the ejector to eject material onto the surface of the other platform to form a three-dimensional object.

9. The printing system of claim 8 further comprising:
a switch configured to selectively couple the first track to the second track at the position past the ejector head in the process direction; and
the controller being further configured to coordinate movement of the platform along the first track with movement of the other platform along the first track by selectively actuating the switch, selectively operating the platform, and selectively operating the other platform.

10. The printing system of claim 1, the platform further comprising:
a surface configured to receive material to form a three-dimensional object.

11. The printing system of claim 1, the platform further comprising:
a wiper configured to wipe the ejector head at a position opposite the ejector head.

12. The printing system of claim 1, the platform further comprising:

a covering member configured to cover the ejector head when the platform is opposite the ejector; and an actuator configured to move the covering member to cover the ejector head during a time period in which the ejector head is unused when the platform is positioned opposite the ejector head.

13. A maintenance system for a three-dimensional object printing device comprising:

a first track;

a platform operable to move along the first track in a process direction;

an ejector head positioned opposite a first portion of the first track;

a second track that is coupled to the first track at a position prior to the platform reaching the ejector head and that is configured to selectively couple to the first track at a position that is in the process direction after the platform passes the ejector head;

a disposal unit positioned opposite a second portion of the second track; and a controller configured to:

operate the platform to move along the second track to the position where the second track and the first track are coupled to enable the platform to move along the first track in the process direction past the ejector head;

operate the platform to perform an operation on the ejector head;

operate the platform to move to the position where the first track selectively couples to the second track after the platform passes the ejector head in the process direction to enable the platform to return to and move along the second track; and operate the disposal unit to remove three-dimensional print media from the platform.

* * * * *